W. H. BREW, DEC'D.
A. L. BREW, ADMINISTRATRIX.
TOWEL CABINET.
APPLICATION FILED JULY 26, 1916.
1,243,670.
Patented Oct. 16, 1917.
3 SHEETS—SHEET 1.
Fig. 1.
Fig. 2.
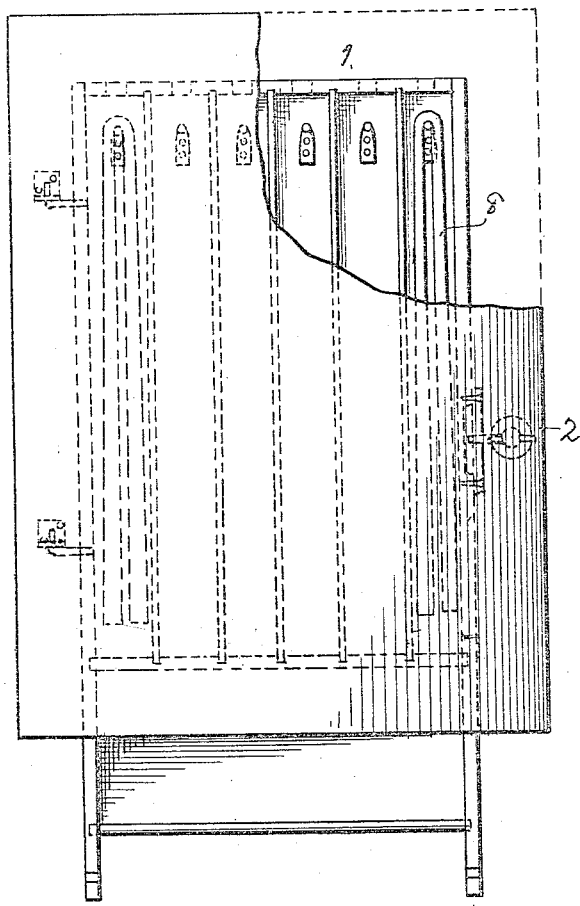
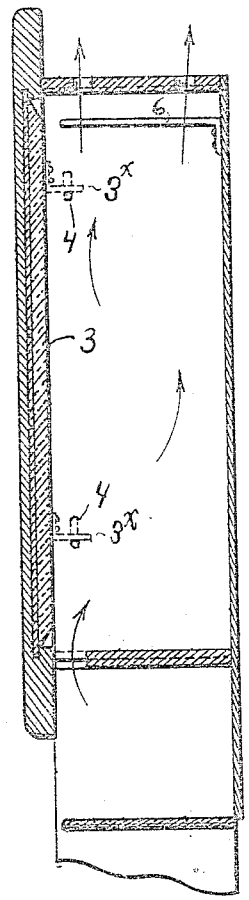
Fig. 3.
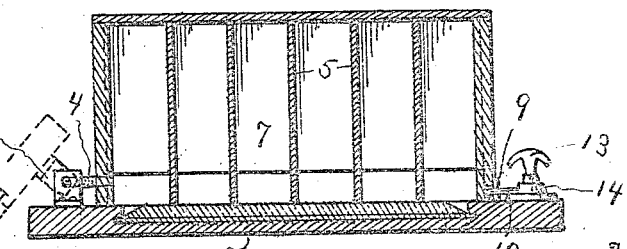
Inventor
William H. Brew, Dec'd.
Annie L. Brew, Administratrix
Witness
Fenton N. Belt
J. N. Sherwood
By Franklin N. Hough
Attorney

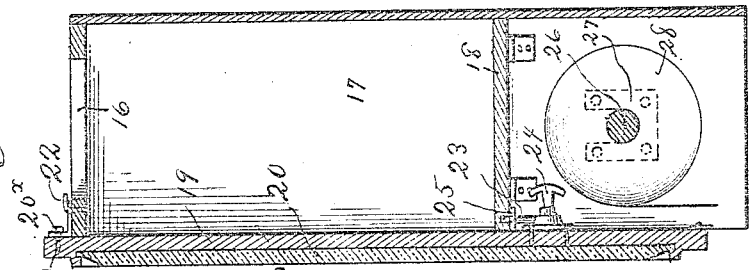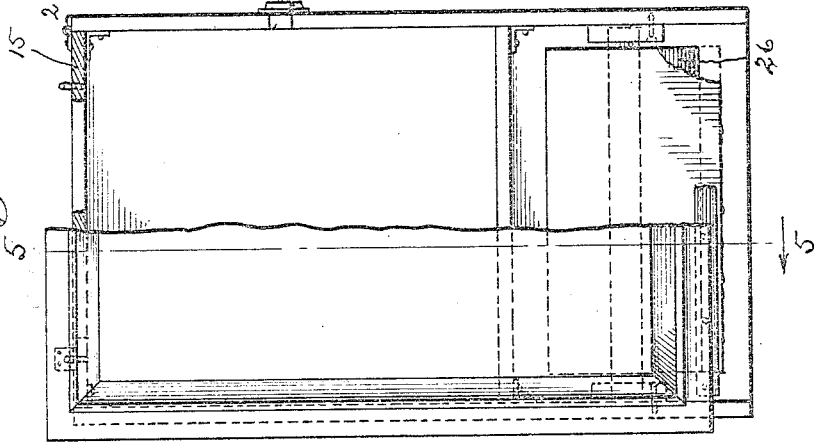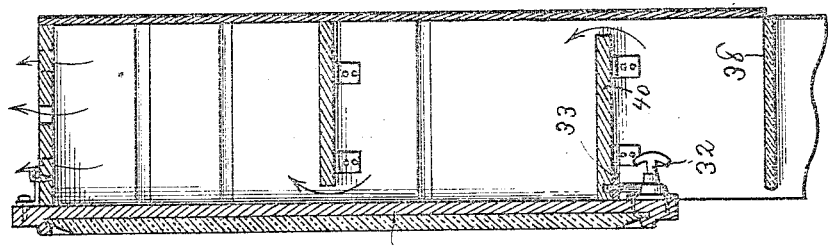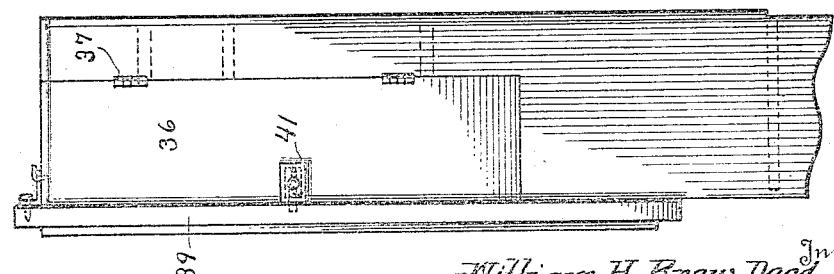

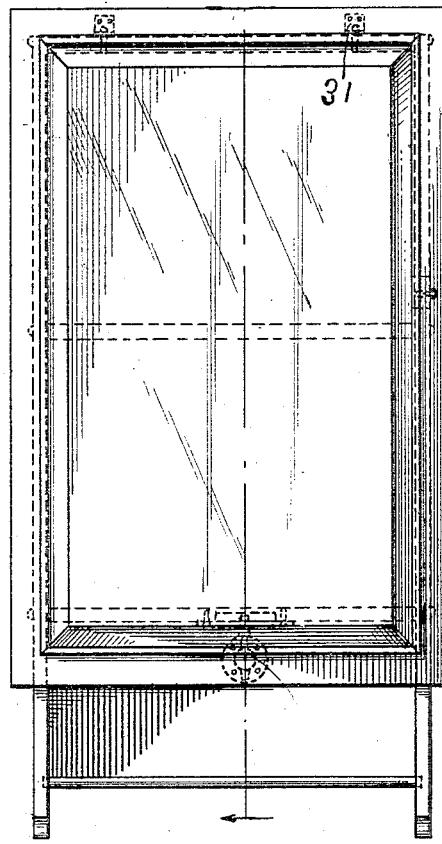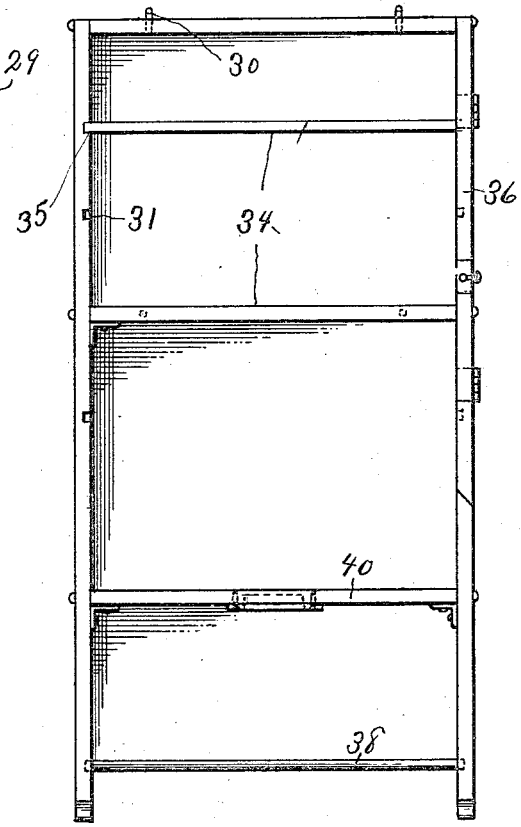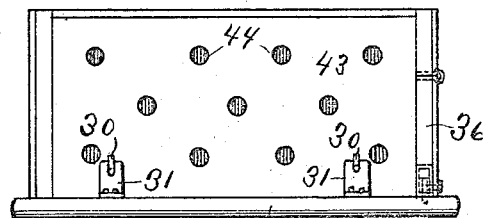

UNITED STATES PATENT OFFICE.

WILLIAM H. BREW, OF WASHINGTON, DISTRICT OF COLUMBIA; ANNIE L. BREW ADMINISTRATRIX OF SAID WILLIAM H. BREW, DECEASED.

TOWEL-CABINET.

1,243,670.　　　　Specification of Letters Patent.　　Patented Oct. 16, 1917.

Application filed July 26, 1916. Serial No. 111,477.

*To all whom it may concern:*

Be it known that I, WILLIAM H. BREW, a citizen of the United States, residing at Washington, in the District of Columbia, have invented certain new and useful Improvements in Towel-Cabinets; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in towel cabinets and consists of a simple and efficient device of this nature having various details of construction, combinations and arrangements of parts which will be hereinafter fully described, shown in the accompanying drawings and then specifically defined in the appended claim.

My invention is illustrated in the accompanying drawings which, with the numerals of reference marked thereon, form a part of this specification and in which:—

Figure 1 is a side elevation of a cabinet embodying the features of my invention, a portion being broken away.

Fig. 2 is a transverse vertical sectional view taken through one of the compartments of the cabinet shown in Fig. 1.

Fig. 3 is a cross sectional view through the cabinet.

Fig. 4 is a view in elevation, partially in section, showing a slightly modified form.

Fig. 5 is a sectional view on line 5—5 of Fig. 4.

Fig. 6 is a detail perspective view of the locking plate.

Fig. 7 is a view in elevation of another modified form of cabinet.

Fig. 8 is a view of the form shown in Fig. 7 with the front removed.

Fig. 9 is a view in side elevation of the form shown in Fig. 7.

Fig. 10 is a central sectional view through the form shown in Fig. 7, and

Fig. 11 is a top plan view of Fig. 10.

Reference now being had to the details of the drawings by numeral, 1 designates a cabinet having a removable front 2 which has a mirror 3 mounted in the inner face thereof. The front containing the mirror has bracket members $3^x$ fastened thereto, each of which is apertured for the reception of a hook hinged screw 4, which latter is fastened to the sides, as shown clearly in Fig. 3 of the drawings, forming means for swinging the front to the position shown in dotted lines in Fig. 3 when it is desired to have access to the interior of the cabinet. Said cabinet, it will be noted upon reference to Figs. 1 and 3 of the drawings, is provided with a plurality of vertically disposed partitions 5, making individual compartments 6, and 7 designates hooks or supports for towels 8, one in each compartment.

Secured to one side of the compartment is a plate 9, a detail of which is shown in Fig. 6 and which is provided with an elongated slot 10 having an inclined or cam edge 11. Said plate is secured over a slot in the side of the cabinet and is adapted to receive a tongue 12 which is integral with and projects from the oscillating locking key 13, mounted in a suitable casing 14, as shown in Fig. 3 of the drawings. Said tongue is adapted to swing in the slot 6 and, when coming in frictional contact with the cam edge 11 of the slot, will tend to hold the front securely locked in a closed position.

Referring to Fig. 4 of the drawings, it will be noted that the cabinet is somewhat differentiated from the form shown in Fig. 1 and consists of the body portion 15 which has an opening 16 in the top for the reception of towels to be placed within the compartment 17, having a bottom 18. In the form shown in Figs. 4 and 5, the front is designated by numeral 19 and has a mirror 20 in the outer face thereof, and the frame carrying the mirror is provided with bracket members $20^x$ which are held by the fastening means 21 and each bracket is apertured to receive a hooked portion of a screw 22 which is fastened in the top of the cabinet, thus forming a hinged connection between the swinging front and the cabinet. The form shown in Figs. 4 and 5 has the fastening means similar to that disclosed in Fig. 1 and consists of the tongue 23 which is actuated by the button 24 which engages a slotted plate 25 in the bottom 18. Underneath the bottom 18, a reel shaft 26 is journaled in the bearing members 27 in the opposite ends of the cabinet and upon which a reel of towel paper 28 is mounted, access to which is had from the open space below the reel.

In Figs. 7 and 8 of the drawings, another modified form of the invention is shown in which the cabinet is provided with a hinged front 39 having apertured bracket members 31 secured thereto and which pivotally engaged the hooked screws 30 secured in the top of the cabinet 3. In this form, the usual locking key, designated by numeral 32, is employed engaging the plate 33, and transverse partitions 34 are mounted in the transverse groove 35, and 36 designates a door which is hinged at 37 to the sides of the cabinet, and 38 designates a partition, preferably of glass, which is mounted in the space below the bottom 40. Said door is provided with a spring-pressed latch or bolt 41 engaging a hole formed in the rear face of the hinged front 39. The top 43 in the forms shown in Figs. 9 and 10 is provided with ventilation perforations 44.

By the provision of a towel cabinet made in accordance with my invention, it will be noted that a simple and efficient means is provided whereby the contents of the cabinet may be protected from dust and other foreign matter, the compartments containing the towels being protected by the front which is hinged and adapted to swing open and thus producing a thoroughly sanitary cabinet.

What I claim to be new is:—

A towel cabinet, including a main compartment itself divided vertically into a plurality of separate compartments, a swinging front, a bottom for said plurality of compartments, a compartment disposed under said bottom and under said plurality of compartments and provided with an unrestricted opening and adapted to receive a reel of towel paper, the said bottom being provided with an opening effecting communication between each compartment of said plurality of compartments and the bottom compartment, a top for said plurality of compartments, the said top being provided with openings communicating with each compartment of the said plurality of compartments, the whole arranged in such manner to provide free ventilation for the entire cabinet, substantially as described and for the purposes set forth.

In testimony whereof I hereunto affix my signature in presence of two witnesses.

WILLIAM H. BREW.

Witnesses:
A. L. HOUGH,
FRANKLIN H. HOUGH.

Copies of this patent may be obtained for five cents each, by addressing the "Commissioner of Patents, Washington, D. C."